US005982896A

United States Patent [19]

Cordery et al.

[11] Patent Number: 5,982,896

[45] Date of Patent: Nov. 9, 1999

[54] SYSTEM AND METHOD OF VERIFYING CRYPTOGRAPHIC POSTAGE EVIDENCING USING A FIXED KEY SET

[75] Inventors: Robert A. Cordery, Danbury; David K. Lee, Monroe; Steven J. Pauly, New Milford; Leon A. Pintsov, West Hartford; Frederick W. Ryan, Jr., Oxford; Monroe A. Weiant, Jr., Trumbull, all of Conn.

[73] Assignee: Pitney Bowes Inc., Stamford, Conn.

[21] Appl. No.: 08/772,739

[22] Filed: Dec. 23, 1996

[51] Int. Cl.[6] .................. H04L 9/00

[52] U.S. Cl. .................. 380/21; 380/23; 380/30; 380/45; 283/72; 283/73; 283/17

[58] Field of Search .................. 380/3, 20, 21, 380/24, 25, 28, 29, 30, 44, 45, 47, 59; 235/431, 435, 470; 364/468.22, 478.03, 478.14, 478.15, 479.07, 601, 604, 704, 709.06; 283/69, 72, 73–75, 93, 113, 17; 178/79, 89

[56] References Cited

U.S. PATENT DOCUMENTS

| | | | |
|---|---|---|---|
| 4,227,253 | 10/1980 | Ehrsam et al. | 375/2 |
| 4,238,853 | 12/1980 | Ehrsam et al. | 375/2 |
| 4,423,287 | 12/1983 | Zeidler | 178/22.08 |
| 4,850,017 | 7/1989 | Matyas et al. | 380/45 |
| 4,888,800 | 12/1989 | Marshall et al. | 380/21 |
| 5,142,577 | 8/1992 | Pastor | 380/21 |
| 5,231,666 | 7/1993 | Matyas et al. | 380/25 |
| 5,790,677 | 8/1998 | Fox et al. | 380/24 |

*Primary Examiner*—Tod R. Swann
*Assistant Examiner*—Paul E. Callahan
*Attorney, Agent, or Firm*—Charles R. Malandra, Jr.; Melvin J. Scolnick

[57] ABSTRACT

A method for controlling keys used in the verification of encoded information generated by a transaction evidencing device and printed on a document comprises the steps of generating a plurality of random verifier master keys to obtain a set of verifier master keys consisting of a fixed number of keys; generating at least one pointer by applying a psuedorandom algorithm to data unique to the transaction evidencing device; calculating a plurality of verifier token keys to obtain a verifier token key set corresponding to the set of verifier master keys; encrypting the verifier token key set with a privacy key; and distributing the set verifier token keys and the privacy key to verifiers. The token keys are a function of the verifier master keys and a code valid for a limited time. The pointer algorithm is an appropriate symmetric key cryptographic algorithm and the code is function of a date dependent parameter. The master keys are distributed to postal and vendor data centers.

5 Claims, 4 Drawing Sheets

FIG. 6

| | |
|---|---|
| KEY VERSION | 2 DIGITS |
| DATE OF MAILING | 6 DIGITS |
| POSTAGE | 6 DIGITS |
| PIECE COUNT | 6 DIGITS |
| METER NUMBER | 8 DIGITS |
| ORIGIN | 5 DIGITS |
| VENDOR ID | 2 CHARACTERS |
| VENDOR DIGITAL TOKEN | 1 DIGITS |
| POSTAL DIGITAL TOKEN | 1 DIGITS |
| VERIFIER DIGITAL TOKEN | 3 DIGITS |
| ERROR CORRECTION CODE | 6 CHARACTERS |

FIG. 7

| | |
|---|---|
| SIGNATURE ALGORITHM FLAG | 1 DIGIT |
| DEVICE ID/TYPE | 14 DIGITS |
| KEY VERSION | 2 DIGITS |
| LICENSE ID | 10 DIGITS |
| DATE OF MAILING | 6 DIGITS |
| POSTAGE | 6 DIGITS |
| RATE CATEGORY | 4 CHARACTERS |
| ORIGIN | 12 DIGITS |
| DESTINATION (COMPUTER-BASED ONLY) | 12 DIGITS |
| SOFTWARE ID | 12 DIGITS |
| ASCENDING REGISTER | 12 DIGITS |
| DECENDING REGISTER | 12 DIGITS |
| VENDOR DIGITAL TOKEN | 1 DIGITS |
| POSTAL DIGITAL TOKEN | 1 DIGITS |
| VERIFIER DIGITAL TOKEN | 3 DIGITS |
| RESERVE FIELD (OPTIONAL) | |
| ERROR CORRECTION CODE | PDF417 SECURITY LEVEL 3 |

SYSTEM AND METHOD OF VERIFYING CRYPTOGRAPHIC POSTAGE EVIDENCING USING A FIXED KEY SET

FIELD OF THE INVENTION

The present invention relates generally to a method for verifying indicia and, more particularly, to such method for verifying indicia using a fixed key set.

BACKGROUND OF THE INVENTION

Digital printing technology has enabled mailers to implement digital, i.e. bit map addressable, printing for the purpose of evidencing payment of postage. Advances in digital printing technology have made it possible to print on a mailpiece a postage indicium that is unique to the mailpiece. The indicium is unique because it includes information relating directly to the mailpiece, for example, postage value, date, piece count, origin postal code and/or destination postal code (referred to herein as indicium information or indicium data).

From the Postal Service's perspective, it will be appreciated that the digital printing and scanning technology make it fairly easy to counterfeit a postal value bearing indicium since any suitable computer and printer may be used to generate multiple copies of an image once generated.

In order to validate an indicium printed on a mailpiece, that is to ensure that accounting for the postage amount printed on a mailpiece has been properly done, it is known to include as part of the franking an encrypted number such that, for instance, the value of the franking may be verified from the encrypted data in the indicium to learn whether the value as printed on the mailpiece is correct. See, for example, U.S. Pat. Nos. 4,757,537 and 4,775,246 to Edelmann et al., as well as U.S. Pat. No. 4,649,266 to Eckert. It is also known to authenticate a mailpiece by including the address as a further part of the encryption as described in U.S. Pat. No. 4,725,718 to Sansone et al. and U.S. Pat. No. 4,743,747 to Fougere et al.

U.S. Pat. No. 5,170,044 to Pastor describes a method and apparatus for the representation of binary data in the form of an indicium comprising a binary array of pixels. The actual arrays of pixels are scanned in order to identify the sender of the mailpiece and to recover other encrypted and plain text information. U.S. Pat. No. 5,142,577 to Pastor describes various alternatives to the DES algorithm for encrypting a message and for comparing the decrypted postal information to the plain text information on the mailpiece.

U.K. Patent Application 2,251,210A to Gilham describes a meter that contains an electronic calendar to inhibit operation of the franking machine on a periodic basis to ensure that the user conveys accounting information to the postal authorities. U.S. Pat. No. 5,008,827 to Sansone et al. describes a system for updating rates and regulation parameters at each meter via a communication network between the meter and a data center. While the meter is on-line status registers in the meter are checked and an alarm condition raised if an anomaly is detected. U.S. Pat. No. 4,853,961 to Pastor describes critical aspects of using public key cryptography for mailing applications.

U.S. Pat. No. 5,390,251 to Pastor et al. describes a system for controlling the validity of printing of indicia on mailpieces from a potentially large number of users of postage meters including apparatus disposed in each meter for generating a code and for printing the code on each mailpiece. The code is an encrypted code representative of the apparatus printing the indicium and other information uniquely determinative of the legitimacy of postage on the mailpieces. The keys for the code generating apparatus are changed at predetermined time intervals in each of the meters. A security center includes apparatus for maintaining a security code database and for keeping track of the keys for generating security codes in correspondence with the changes in each generating apparatus and the information printed on the mailpiece by the postage meter apparatus for comparison with the code printed on the mailpiece. There may be two codes printed, one used by the Postal Service for its security checks and one by the manufacturer. The encryption key may be changed at predetermined intervals or on a daily basis or for printing each mailpiece.

Recently digital meters, such as PostPerfect™ and Personal Post Office™, both manufactured by the assignee of the present invention, have been developed. Such digital meters employ cryptographic means to produce evidence of postage payment. The encryption is performed using cryptographic keys for signing indicium data printed on the envelope with two "digital tokens". In each digital meter, independent keys stored therein are used for generating two digital codes or tokens needed for verification of indicia printed on mailpieces. One digital token provides evidence of postage paid to the Postal Service, and the second digital token provides evidence to the vendor, such as the assignee of the present invention. As used herein, a digital token is a truncation of the result of a symmetric-key cryptographic transformation, such as a truncated Data Encryption Standard Message Authentication Code, applied to data appearing in the indicium. The indicium data elements, also referred to herein as input postal data or simply postal data, may include postage value, date, register values, postal code of the geographical deposit area, recipient address information and piece count. A verifier with access to a key matching the key used for generating the digital token in the digital meter performs digital token validation, i.e., verification that accounting for the postage value printed in the indicium has been properly done.

For security reasons, the keys in each meter are different Information about the meter and mailpiece are combined and separately encrypted with vendor and with postal master keys or keys derived therefrom. Portions of the resulting information are printed on the mail piece as digital tokens. The indicium information and the associated digital tokens can be verified by a device that processes the information in the same manner with the same keys and compares the resulting digital tokens with those printed on the mail piece.

It will be appreciated that in order to verify the indicium information printed on a mailpiece, a verifier must first be able to obtain the key used by the particular meter that generated the indicium. In trying to deal with mailing systems which may incorporate such encryption systems, it must be recognized that the meter population is large and subject to constant fluctuation as meters are added and removed from service. If the same key were to be used for all meters, the key distribution is simple but the system is not secure. Once the code is broken by anyone, the key may be made available to other users and the entire operation is compromised. However, if separate keys are used respectively for each meter then key management potentially becomes extremely difficult considering the fluctuations in such a large population.

U.S. patent application Ser. No. 08/133,416, filed Oct. 8, 1993, and assigned to the assignee of the instant application describes a key management system for mail processing that assigns one of a set of predetermined keys by a determined relationship to a particular meter, effectively allowing multiple meters to share a single key. The key management system includes the generation of a first set of keys which are then used for a plurality of respective postage meters. A first key of the first set of keys is then related to a specific meter in accordance with a map or algorithm. The first key may be changed by entering a second key via an encryption using the first key.

U.S. patent application Ser. No. 08/414,896, filed Mar. 31, 1995, and assigned to the assignee of the instant application, describes a method of token verification in a Key Management System. The method provides a logical device identifier and a master key created in a logical security domain to a transaction evidencing device, such as a digital postage meter. A master key record is created in a key verification box, and the master key is securely stored as a record in a Key Management System archive. Evidence of the transaction information integrity and the master key record from the Key Management System archive are input into a token verification box. The token verification box determines that the master key is valid, uses the master key to verify the evidence of transaction information integrity, and outputs an indication of the result of the verification of the evidence of transaction information integrity. The master key record includes the logical device identifier, the master key and a digital signature associating the logical device identifier and the master key. The token verification box checks the digital signature to verify the association of the logical device identifier and the master key within the logical security domain.

SUMMARY OF THE INVENTION

It has been found that distributing master keys of the digital meters to verifiers may jeopardize the security of the verification system. The present invention performs verification of indicia using time dependent "token keys" that are valid for a limited time. Thus, the present invention provides a verification system that includes a verifier that does not require access to master keys stored in the digital meters to perform verification of indicia. It has been found that the present invention improves security of digital meters by providing a simplified means for posts to validate indicia in real time and reduces the need to recreate or communicate the master keys of the digital meters. It has also been found that the present invention minimizes the cost of verification by taking advantage of existing postal processes and infrastructure. It has further been found that the present invention achieves interoperability of the indicium verification infrastructure with postal processing. An important element of the verification infrastructure is the cost of maintenance of a correct, secure and timely correspondence between postage evidencing keys and postage verification keys.

The present invention provides for validation at local or regional post offices. The token key set contains a fixed number of encrypted verification token keys that are date dependent, for example, preferably valid for only one month. If the verification token key set is stolen or compromised in any way, it is only useful for a limited time, such as one month.

The postal data is read from the indicia. The encrypted, date dependent token key for the meter is retrieved from the token key set stored at the verifier. The verifier decrypts the verification token key and generates a digital verifier token using the verification token key with the postal data. Finally, the verifier compares the generated verifier token to the verifier token read from the indicia and a pass/fail determination is made to complete the validation process.

In accordance with the present invention three digital tokens are used to evidence postage. One token is verified, as needed, by the Postal Service and a second is verified, as needed, by the vendor. These first two tokens are the same as set forth in U.S. Pat. No. 5,390,251, previously noted. The third token is added for distributed postal verifiers for "real time" verification. To simplify key management for the verifiers, a fixed Master Verifier fixed size Key Set, e.g., 1000 keys, provides a method to verify indicia without distributing data for each meter produced. The fixed key set is used to generate a set of time dependent token keys. These token keys are only valid for a limited time period. The token key set is signed by the Postal Service and encrypted with a special purpose distribution key for each verifier periodically, for example, once per month. The Postal Service encrypts the token key set with a distribution key to ensure confidentiality of the token key set. The distribution key is encrypted with a session key that is unique for each verifier. The session keys are distributed via an alternate channel, for example through physical means. The session keys are updated regularly. The distributed session keys are updated regularly, and distributed by an alternate channel. A secure co-processor for each verifier maintains the confidentiality of the token key while it is decrypted for verifying an indicium. The co-processor must be physically secure to protect the token keys that have been distributed. If a secure co-processor of a verifier is compromised, such compromise will not provide access to future token keys.

DESCRIPTION OF THE DRAWINGS

The above and other objects and advantages of the present invention will be apparent upon consideration of the following detailed description, taken in conjunction with accompanying drawings, in which like reference characters refer to like parts throughout, and in which:

FIG. 6 is a block diagram of data proposed for an OCR version of a fixed key set indicium in accordance with the present invention; and FIG. 7 is a block diagram of data proposed for a bar-code version of a fixed key set indicium in accordance with the present invention.

DETAILED DESCRIPTION OF THE PRESENT INVENTION

Figure 1:
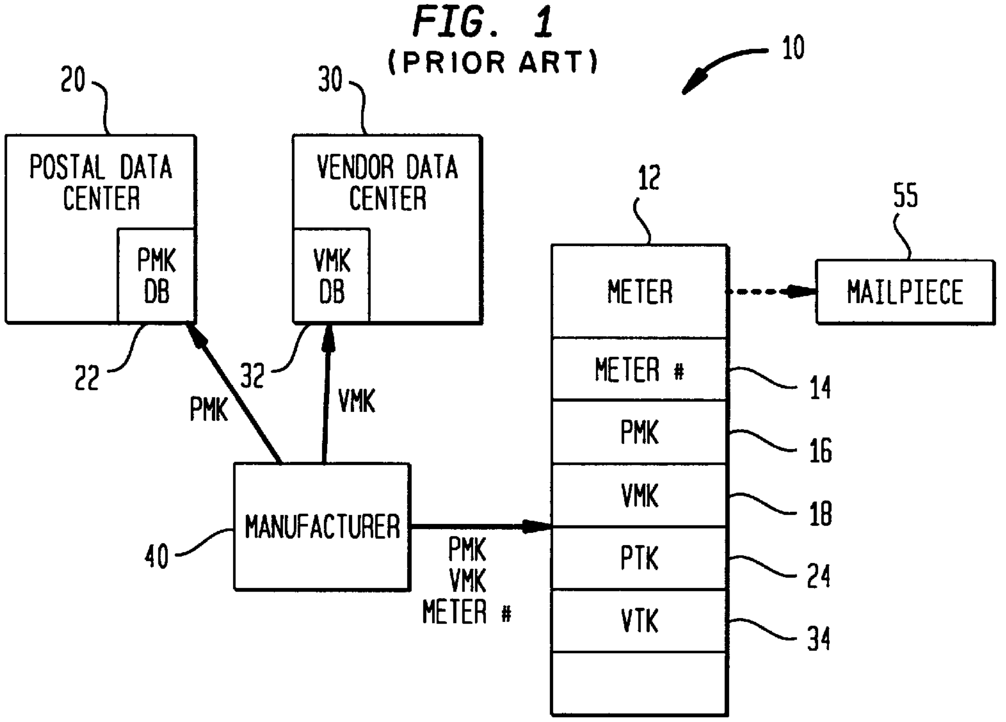
FIG. 1 (PRIOR ART)
FIG. 1 is a block diagram of a prior art postage evidencing and verification system.

In describing the present invention, reference is made to the drawings, wherein there is seen in FIG. 1 a prior art system, generally designated 10, for verifying cryptographic postage evidencing using a fixed key set. The system in accordance with the present invention comprises a digital meter 12 interacting with a plurality of different security or forensic centers: a postal data center 20 and a vendor data center 30. A meter manufacturer 40 manufactures a customized digital meter 12 with a meter number 14, a postal master key 16 and a vendor master key 18. The postal master key 16 is stored in a master key database 22 at the postal data center 20. The vendor master key 18 is stored in a master key database 32 at the vendor data center 30. When meter 12 is initialized the postal and vendor master keys are used to generate in the meter respective postal and vendor token keys 24 and 34.

Preferably, the postal and vendor token keys are date dependent, for example, each being valid for only one month at which time new token keys must be generated. The postal and vendor token keys 24 and 34 are used to generate respective unique postal and vendor tokens which are encrypted numbers based on postal data uniquely attributable to the particular meter 12. For a more detailed description of the generation of digital tokens, see U.S. patent application Ser. No. 5,390,251, previously noted.

The postal token key 24 is used by meter 12 to generate a postal digital token which is printed on a mailpiece 55. The postal data center 20 verifies the postal token read from mailpiece 55 using the postal token key 24 which is generated at the postal data center 20 using the postal master key 16 and postal data read from the indicium of mailpiece 55. Likewise, the vendor token key 34 is used by meter 12 to generate a vendor digital token which is printed on mailpiece 55. The vendor data center 30 verifies the vendor token read from mailpiece 55 using the vendor token key 34 which is generated at the vendor data center 30 using the vendor master key 18 and postal data read from the indicium of mailpiece 55.

Further details of verifying cryptographic postage evidencing using a fixed key set are to be found in U.S. application Ser. No. 08/133,416, filed Oct. 8, 1993, previously noted,

FIXED KEY SET KEY MANAGEMENT SYSTEM

Figure 2:
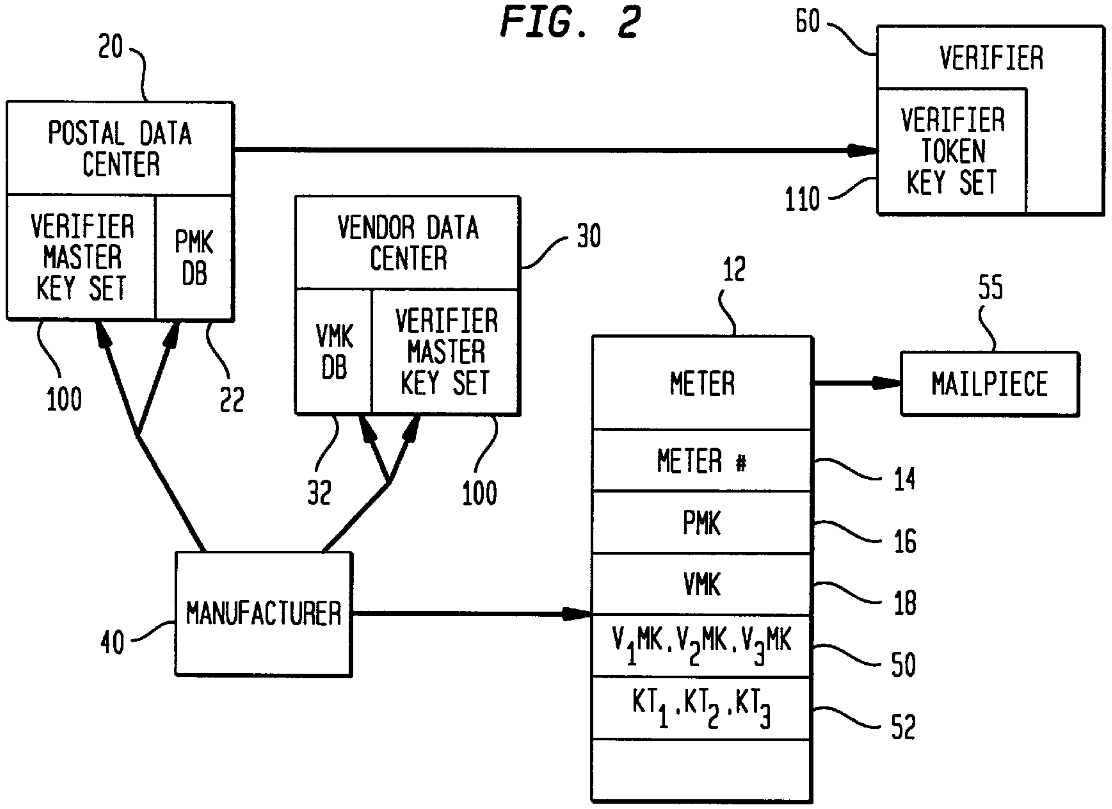
FIG. 2 is a block diagram of a postage evidencing and verification system in which the present invention may be performed.

Referring now to FIG. 2, a system in accordance with the present invention is shown for verifying cryptographic postage evidencing using a fixed key set. The system components that are identical to the prior art system shown in FIG. 1, which are designated with the same reference numerals, operate in the manner described above.

The postal and vendor data centers 20 and 30, wherever maintained, are connected electronically, for example by telecommunication, with any or all verification centers, also referred to herein as verifiers, one of which is indicated here at 60.

The present invention provides a symmetric-key truncated message authentication code (MAC) based system that simplifies key management issues for verifiers. (A symmetric-key truncated MAC is also referred to herein as a digital token.) Three digital tokens provide postage evidence to three different authorities: the postal data center 20, the vendor data center 30, and the verifiers 60. The main difference in the three digital tokens is the key management system. The Post verifies one digital token off-line at the secure postal data center 20. The vendor secure data center 30 has the key to validate the second digital token when required. These first two digital tokens are similar to those described in U.S. Pat. No. 5,390,251, previously noted, and currently produced for Personal Post Office digital meters manufactured by Pitney Bowes of Stamford, Conn. During meter manufacture, the vendor securely generates and encrypts the keys used to produce these first two digital tokens, and assigns them to each meter. A secure key management system stores the keys in signed, encrypted records, that include meter serial number and key status.

As used herein, on-line verification is verification performed during the real-time processing of the mailpieces; and off-line verification is verification performed separate from the real-time processing of the mailpieces.

In accordance to the present invention the third, or verifier, digital token is for distributed postal verifiers which perform the only on-line verification. The keys 50 are selected from a fixed Verifier Master Key Set 100. Although, there is a security trade-off in using a fixed key set, off-line verification of postal and vendor digital tokens compensates for this trade-off. The present invention provides an advantage over previous methods for verifying indicia integrity because verification is achieved without distributing unique keys stored in each meter.

The Verifier Master Key Set 100 is not distributed to verifiers 60. The distributed keys are from an intermediate Token Key Set 110, generated at the postal data center 20, based on the month and year, using the Verifier Master Key Set 100. Token keys are only valid for one month.

The Token Key Set 110 is securely communicated to the verifiers 60. It may be signed by the Postal Service and is encrypted with a fresh distribution key generated by the Postal Service. A verifier specific session key encrypts the distribution key. The verifiers securely receive fresh session keys through an alternate channel, for example, by physical distribution. Like all symmetric-key systems, the verifier 60 requires access to a secret-key of each meter to verify indicia. Each meter 12 generates its token keys 52 in an intermediate step prior to generating a digital token. The verifier 60 retrieves the token key from the Token Key Set 110.

In this manner, the present invention protects the Verifier Master Key Set 100. If the Token Key Set is compromised, thus exposing current token keys, such compromise does not provide access to future token keys. Furthermore, this type of failure can be detected using the vendor and postal digital tokens. A physically secure co-processor, for each verifier, maintains confidentiality of the decrypted token keys which verify indicia. The Token Key Set 110 is always encrypted while it is outside the secure co-processor. When presented with indicium data, the verifier responds only with a message that the indicium is valid or invalid. The verifier does not respond with the valid digital token.

Compared to a public-key system, there is much less cryptographic indicia data with the symmetric-key system of the present invention. Either an optical character recognition (OCR) or a bar code symbology fits the area currently allocated for the indicium. If the data is printed in a bar code, a large module size can be used, improving readability. Error correction improves readability, for example, at PDF417 security level 3, the indicium has over 25% of the data as error correction code, resulting in a robust indicium that is easier to print and read. The OCR version allows for error-correction code and human back-up of the automated scanning process.

Figure 3:
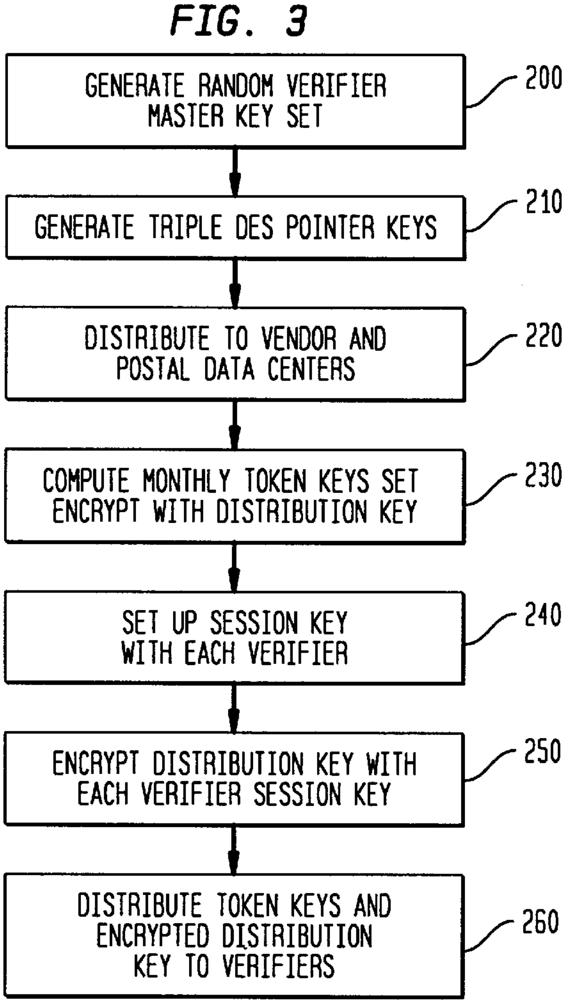
FIG. 3 is a flow chart of the initialization and distribution of a fixed key set of verifier token keys.

Referring now to FIG. 3 a process for the initialization and distribution of a fixed key set of verifier token keys is shown in accordance with the preferred embodiment of the present invention. At step 200, the Manufacturer 40 generates a random verifier master key "1000 key" set 100.

At step 210, Manufacturer 40 generates triple DES pointer keys.

At step 220, Manufacturer 40 distributes the verifier master key set 100 and pointer keys to the Vendor and Postal Data Centers 30 and 20.

At step 230, the Postal Data Center 20 calculates monthly token keys for a verifier token key set 110, and encrypts the verifier token key set with a distribution key.

At step 240, the Postal Data Center 20 establishes a session key with each verifier 60 by techniques well known in the art.

At step 250, the Postal Data Center 20 encrypts the distribution key with each verifier session key, and, at step 260, distributes the token key set and the encrypted distribution key to each of the verifiers. Steps 230 through 260 are repeated each month.

Figure 4:
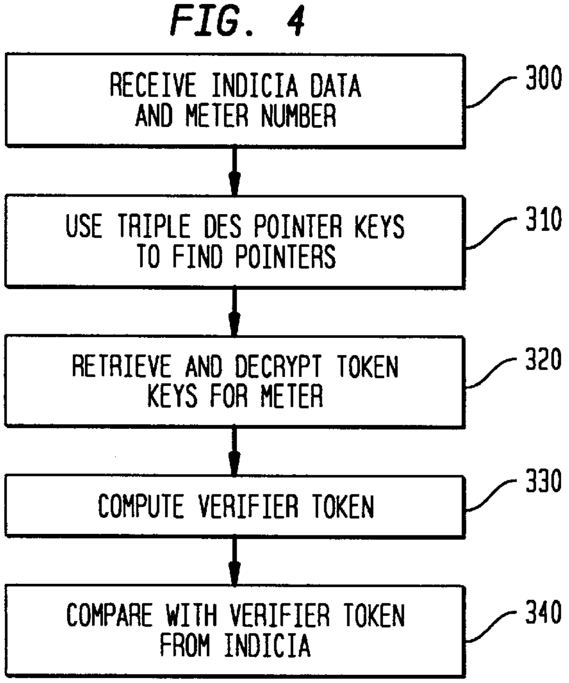
FIG. 4 is a flow chart of token verification by a verifier.

Referring now to FIG. 4, a process for secure co-processor verifier token verification is shown in accordance with the preferred embodiment of the present invention. At step 300, the verifier 60 receives indicium data and a meter number 14 read from an indicium being verified. At step 310, verifier 60 uses the triple DES pointer keys to obtain pointers related to the meter 12 that printed the indicium being verified. At step 320, verifier 60 uses the pointers to retrieve the encrypted verifier token keys 34 of the meter 12 and then decrypts the retrieved keys. At step 330, verifier 60 regenerates the verifier token 34, and, at step 340, compares the regenerated verifier token from the indicium with the verifier token retrieved from the verifier token key set 110.

Figure 5:
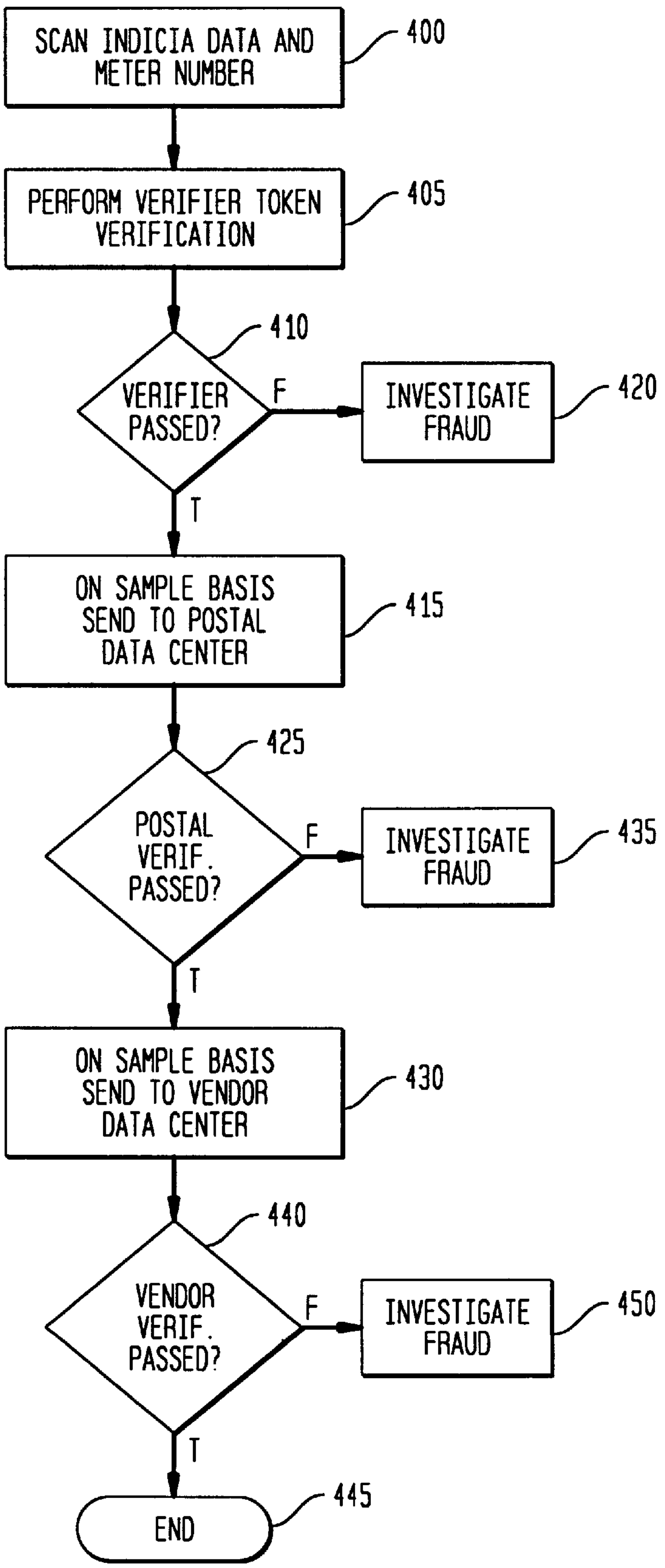
FIG. 5 is a flow chart of complete verification by the postage evidencing and verification system.

Referring now to FIG. 5, the overall verification process is shown in accordance with the preferred embodiment of the present invention. At step 400, the indicium printed on a mailpiece is scanned to obtain indicia data, including a verifier token and a meter number included therein. At step 405, verifier 60 performs verifier token verification as set forth above. If verification is successful, at step 410, the mailpiece is verified and the indicia data is sent, at step 415, to the Postal Data Center 20, on a sample basis for off-line verification. If the verification was not successful, then a fraud investigation is performed at step 420.

At step 425, the Postal Data Center 20 performs off-line verification of the postal token in the indicia data. If successful, then, at step 430, the indicia data is sent to the Vendor Data Center 30 for further off-line verification. If any verification is not successful, then a fraud investigation is performed at step 435.

At step 440, the Vendor Data Center 30 performs off-line verification of the vendor token in the indicia data. If successful, then, at step 445, the verification process of the mailpiece has been successfully concluded. If the verification was not successful, then a fraud investigation is performed at step 450.

The cryptographic strength of the algorithm is as strong as multiple DES. Other suitable symmetric key algorithms can be adapted for the purpose of the present invention. The fixed set of keys simplifies key management for remote postal verifiers. The additional infrastructure required is a secure co-processor for each verifier, generation and distribution of a small set of token keys once per month and provision of a distribution key to each verifier periodically. None of these requirements adds significantly to the cost. The verifiers already need the capability to transfer files for the missing meter list, the duplicate detection lists, and for distribution of public-keys.

Mailers will continue finishing mail using mailing machines. The proposed symmetric key system provides multiple paths of payment assurance through a few digits added to indicia information.

There are various methods of generating the Verifier Master Key Set 100. A minimum data solution is to derive the keys based on the meter number through a cryptographic algorithm. The meter does not require this algorithm, but the verifier needs to be able to calculate keys for each meter. A good solution is to generate a large set of random keys indexed by meter number before manufacturing the meters. The present invention provides an intermediate solution using a fixed key set, e.g., one thousand keys, from which the meter keys are derived.

The meter generates the postal and vendor digital tokens, by keys known to the postal data center 20 and vendor data center 30, respectively. Distributing these keys to postal verifiers 60 would require an infrastructure that would be beyond a desired postal infrastructure.

The verifier digital token is a truncated triple DES MAC. The verifier 60 selects three DES keys used to generate the MAC from the Token Key Set 110. The three pointers used to select the keys are derived by a cryptographic pseudo-random function based on the meter number 14. The meter 12 has no information about this function. The meter generates the verifier token keys using its Verifier Master Keys 50.

A table of $2^N$ Verifier Master Keys are generated independently and randomly. The table index is an N bit long pointer p. In the preferred embodiment, N=10, which yields 1,024 Verifier Master Keys. Each meter 12 uses an ordered set of three Verifier Master Keys 50, resulting in one billion different meter key sets.

A secure co-processor signs and encrypts this set of keys. The encrypted key set is securely shared by the postal data center 20, and the vendor data center 30. Access to the encrypted list is limited to secure co-processors at the vendor data center 30 and the postal data center 20. The vendor data center 30 installs keys into meter 12 through the manufacturing operation 40. The postal data center 20 uses the Verifier Master Key Set to generate the Verifier Token Key Set 110.

The meter 12 and the verifier 60 use token keys to calculate the verifier digital token via a truncated CBC-DES MAC. ("CBC" is cipher-block-chaining mode of DES.)

$$\text{truncate}(\text{DES}(Kt_3, \text{Data}_3 \oplus \text{DES}(Kt_2, \text{Data}_2 \oplus \text{DES}(Kt_1, \text{Data}_1)))).$$

The $\oplus$ symbol is exclusive-or. The three data blocks all contain variable postal data, such as the piece count. The truncation operation results in a correct digital token, at least 10 bits long, with very low probability that the verifier digital tokens can be guessed correctly.

KEY MANAGEMENT

A triple-DES algorithm derives pointers from the meter identification number:

$$\text{DES}(\mathcal{K}_1, \text{DES}(\mathcal{K}_2, \text{DES}(\mathcal{K}_3, \text{meter identification number}))) = (D, p_1, p_2, p_3).$$

The keys $\mathcal{K}_i$ are known to secure co-processors located at the vendor and postal data centers, and at the verification sites. There may be multiple sets of these keys, based on vendor and meter data.

The pointers $p_i$ are, for example, each 10 bits long, and D is the remaining, discarded 34 bits. The size of the database depends on these numbers. Each Verifier Master Key $K(p_i)$ is an ordered pair of two DES keys, $(K_0(p_i), K_1(p_i))$. Each meter is initialized with $K(p_1)$, $K(p_2)$, and $K(p_3)$ corresponding to the meter identification number.

The verifier master keys 50, acting on the date (MMYYYY), using triple DES, produce the monthly verifier token keys:

$$Kt_1 = \text{DES}(K_0(p_1), \text{DES}(K_1(p_1), \text{DES}(K_0(p_1), \text{MMYYYY}))),$$

$$Kt_2 = \text{DES}(K_0(p_2), \text{DES}(K_1(p_2), \text{DES}(K_0(p_2), \text{MMYYYY}))),$$

$Kt_3$=DES($K_0$($p_3$), DES($K_1$($p_3$), DES($K_0$($p_3$), MMYYYY) ) ).

These verifier token keys 52 are valid for a selected period of time, for example, one month. Given the current verifier token keys, the problem of an attacker calculating the verifier master keys or the verifier token keys for any other month is intractable.

Initialization data in each verifier 60 allows mutual authentication with the postal data center 20. This information may be public-key certificates of the verifier 60 and the postal data center 20. The verifier secure co-processors must be securely distributed and managed. Each month, when receiving new token keys, the verifier 60 is remotely inspected to be sure it is present and not tampered.

The postal data center 20 generates monthly session keys for each verifier 60. A monthly distribution key is used to provide confidentiality of the Token Key Set 110. The postal data center 20 distributes the monthly Token Key Set 110 to verifiers 60, encrypted with the monthly distribution key. This file has a reasonable size: If the fixed key set 110 provides a unique key for each meter number, then the size equals the number of meters times 16 bytes per key, and the Token Key Set 110 can be distributed by a monthly CD-ROM sent to the verifiers 60, or downloaded via the network. If the fixed key set 110 contains a few thousand keys, then its size is a few times 16 kilobytes. It can be distributed to the verifiers 60 by a monthly diskette, or through a reasonable size downloaded file.

There is a risk of exposing Verifier Master Keys in this system. In order to allow recovery if this happens, the system needs a method of updating the keys. This requires a secure method of installing new keys in each meter 12, and a key version number in the indicium so the verifier 60 can select the correct key set during an interim period, for example, before all new keys are installed.

FIXED KEY SET INDICIA

The data proposed for the Fixed Key Set indicium is outlined above. The only additions are the verifier digital token and additional error-correction code. FIG. 6 shows the data in an OCR version. FIG. 7 illustrates a bar code version.

The present invention is described in a preferred embodiment for the verification of postage evidencing printed on a mailpiece. It will be understood by those skilled in the art that the present invention is suitable for use in verifying any physical object which carries information in a visual form.

While the present invention has been disclosed and described with reference to a single embodiment thereof, it will be apparent, as noted above, that variations and modifications may be made therein. It is, thus, intended in the following claims to cover each variation and modification that falls within the true spirit and scope of the present invention.

PostPerfect™ and Personal Post Office™ are trademarks of Pitney Bowes Inc., the assignee of the present invention.

What is claimed is:

1. A method of verifying indicia by a verifier, the method comprising the steps of:

obtaining indicium data and a transaction evidencing device identification from an item;

using a pointer algorithm to find pointers;

retrieving token keys for the transaction evidencing device;

computing a verifier token based on the retrieved token key;

comparing the computed token with the verifier token from the indicium data.

2. The method of claim 1 comprising the further step of:

investigating for fraud when the computed token is different from the verifier token.

3. The method of claim 1 comprising the further steps when the computed token is the same as the verifier token:

verifying a postal token from the indicium data; and verifying a vendor token from the indicium data.

4. The method of claim 1 wherein the step of retrieving token keys for the transaction evidencing device includes decrypting the token keys.

5. The method of claim 2 comprising the further step of:

storing at least one of said master keys into a transaction evidencing device.

* * * * *